United States Patent [19]
Tanis

[11] Patent Number: 5,005,428
[45] Date of Patent: Apr. 9, 1991

[54] INVERTED WEIR FOR CONDUIT

[76] Inventor: Steven W. Tanis, 6507 S. Alder, Tempe, Ariz. 85283

[21] Appl. No.: 479,868

[22] Filed: Feb. 14, 1990

[51] Int. Cl.[5] .............................................. G01F 1/40
[52] U.S. Cl. .................... 73/861.52; 73/215; 138/37; 138/39; 138/40; 138/44
[58] Field of Search ...................... 138/37, 39, 40, 44; 73/861.52, 215, 216

[56]  References Cited
U.S. PATENT DOCUMENTS

| | | | |
|---|---|---|---|
| 3,146,851 | 9/1964 | Ludlow et al. | 138/37 |
| 3,326,041 | 6/1967 | Reed | 138/44 |
| 3,403,703 | 10/1968 | Reimann | 138/92 |
| 3,427,878 | 2/1969 | Gerlitz et al. | 73/215 |
| 4,499,891 | 2/1985 | Seppamaki | 138/39 |
| 4,605,501 | 8/1986 | Tyson | 138/92 |
| 4,794,956 | 1/1989 | Gordon et al. | 138/39 |

Primary Examiner—James E. Bryant, III
Attorney, Agent, or Firm—Tod R. Nissle

[57]  ABSTRACT

A method and apparatus for installing a weir to divert fluid flowing in a conduit and to convert potential fluid energy to kinetic energy.

1 Claim, 1 Drawing Sheet

INVERTED WEIR FOR CONDUIT

The invention relates to a method and apparatus for installing an inverted weir to divert fluid flowing in a conduit and to convert potential fluid energy to kinetic energy.

In a further respect, the invention pertains to a method and apparatus for producing laminar low of fluid through a weir in a conduit.

In still another respect, the invention pertains to a method and apparatus permitting under Bernoulli's principle the accurate measurement of the internal pressure in a weir installed in an existing conduit network to divert a liquid flowing through the conduit network at a steady flow rate.

It is often necessary to divert a fluid flowing through a conduit network and to divert the fluid while maintaining the laminar flow of the fluid and while maintaining a desired internal fluid pressure in the conduit network. There apparently does not exist a method and apparatus for simply and inexpensively accomplishing such a fluid diversion in a conduit network.

Accordingly, it would be highly desirable to provide a method and apparatus for diverting the flow of fluid in a conduit while maintaining laminar fluid flow through the conduit and while monitoring the internal pressure of a fluid steadily flowing through the conduit.

Therefore, it is a principal object of the invention to provide improved weir apparatus for diverting the flow of a liquid through a conduit or channel.

A further object of the invention is to provide improved weir apparatus which diverts the laminar flow of fluid through a conduit and produces kinetic energy while maintaining the laminar flow of the fluid.

Another object of the invention is to provide improved unitary self-contained inverted weir apparatus which monitors the internal pressure in a conduit in accordance with the principle of continuity in fluid flow and with Bernoulli's principle, and which is readily integrated in an existing conduit network.

Still another object of the invention is to form the weir so it deflects fluid downwardly from the highest elevation of the conduit instead of, as is usual and customary, deflecting fluid upwardly from the lowest elevation of the conduit. This inversion of the weir allows settleable solids that might collect in a conventional weir to cleanly flow through the weir.

These and other, further and more specific objects and advantages of the invention will be apparent to those skilled in the art from the following detailed description thereof, taken in conjunction with the drawings, in which.

Briefly, in accordance with my invention, I provide an improvement to be used in combination with a conduit. The conduit includes a central space through which fluid normally moves by laminar flow along the conduit, the central space having at each point along the length of the conduit a generally constant cross sectional area perpendicular to the direction of fluid flow through the conduit; a wall having an inner surface circumscribing the central space; and, one end through which fluid flows out of the conduit. The improvement comprises a weir. The weir includes an inner space having at leach point along the length of the weir a cross sectional area perpendicular to the direction of fluid flow; a wall having an inner surface circumscribing said inner space of said weir; and, a first end shaped and dimensioned to be connected to the one end of the conduit through the first end of the weir. The first end of the weir includes first section of the inner surface, the first section of the inner surface circumscribing a first portion of the inner space. The first portion of the inner space has a cross sectional area generally equivalent to the cross sectional area of the conduit to facilitate the laminar flow of fluid from one end of the conduit through the first end of the weir. The inner surface of the wall of the weir includes a flat elongate surface portion positioned along the weir; and, an actuate portion opposing and parallel to the flat elongate surface. The flat elongate portion and the actuate portion circumscribe a second portion of the inner space and are shaped and dimensioned such that the cross sectional area of the second portion of the central space is less than the cross sectional area of the first portion and are shaped to produce laminar flow in fluid flowing through the weir intermediate the flat elongate surface portion and the actuate portion. The weir also includes means for measuring fluid pressure in the weir.

Figure 1:
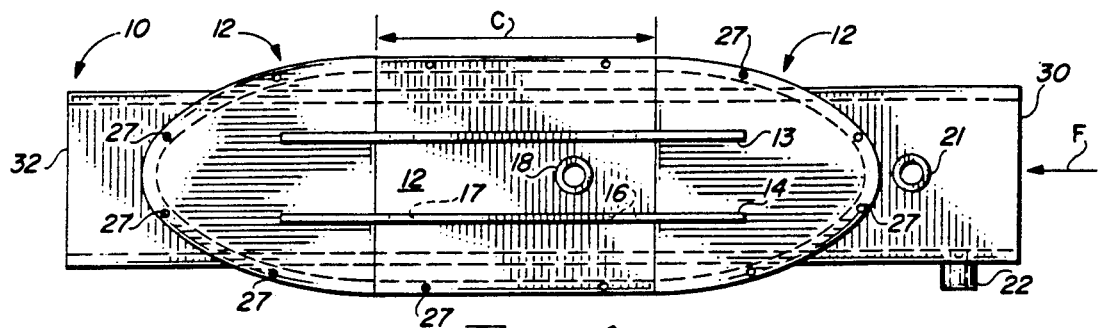
FIG. 1 is a top view of a fluid diverting weir constructed in accordance with the principles of the invention.
Figure 2:
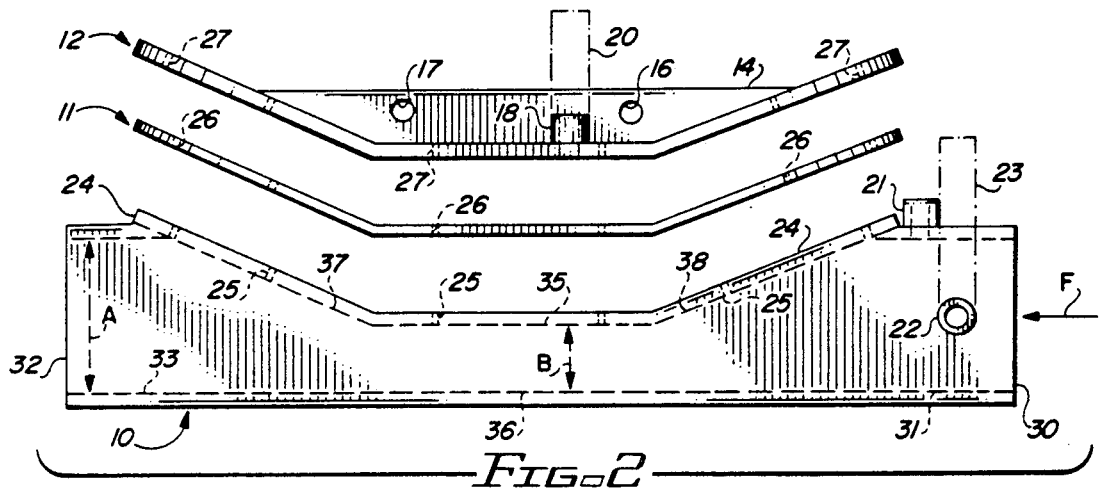
FIG. 2 is a side assembly view of the weir of FIG. 1.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate a weir constructed in accordance with the principles of the invention and including base 10, gasket 11, and plate 12. Ribs 13, 14 brace and support plate 12. Apertures 16 and 17 are formed through rib 14 to facilitate the lifting and transport of plate 12 and of the weir after the weir is fully assembled. An opening extends through nipple 18 and plate 12. A transparent standpipe 20 is normally sealingly attached to nipple 18. Base 10 is provided with a vent nipple 21. An opening extends through nipple 21 and the cylindrical wall of base 10. Base 10 is also provided with nipple 22. An opening extends through nipple 21 and the cylindrical wall of base 10. An L-shaped or "elbow" standpipe 23 is normally attached to nipple 22. Standpipes 20, 23 typically are transparent so the fluid level in the standpipes 20, 23 can be readily determined. Flange 24 is formed around the periphery of an elongate opening formed in the upper portion of base 10. Apertures 26 extend through flange 24 at spaced apart points therealong. Apertures 26 extend through gasket 11 at spaced apart points therealong. Apertures 27 extend through plate 12 at spaced apart points therealong. In assembling the weir of FIGS. 1 and 2, gasket 11 is placed against flange 24 and plate 12 is placed against gasket 11. Apertures 26, 26 and 27 are formed such that each aperture 27 registers with an aperture 26 and 26. A bolt (not shown) placed through each aperture set 26, 26 and 27 and is tightened down by placing a nut (not shown) placed on the threaded end of the bolt. Any other desirable means can be utilized to sealingly secure plate 12 to base 10. Vent 21 can comprise a pressure release valve which is actuated when the pressure in the weir exceed a selected level. Vent nipples 21 can also include a manually operated valve for bleeding air from within the weir or for reducing the pressure in the weir.

The weir of FIGS. 1 and 2 includes a first end 30 shaped and dimensioned to be connected to one end of a circuit. The conduit includes a central space through which the fluid normally moves by laminar flow along the circuit. The central space of the conduit has at each point along the length of the conduit a generally constant cross sectional area which is perpendicular to the direction of fluid flow through the elongate conduit. The conduit also has a wall, normally cylindrical, which circumscribes the central space in the conduit. In the weir of FIGS. 1 and 2, plate 12 and the cylindrically shaped base 10 define a wall which circumscribes the inner space of the weir is the space of the weir. The inner space through which fluid flows. The cylindrical first end of the weir preferably has a cylindrical inner wall surface 31 having a diameter indicated by arrows A, which corresponds to the diameter of the second inner cylindrical surface 33 of the second end 32 of the weir and which also corresponds to the diameter of the inner surface of the wall of the conduit from which water or another fluid flows into the first end of the weir. The equivalent inner diameters of the first end 30 and of the conduit help to maintain laminar fluid flow, indicated by arrow F, from the conduit into the weir.

Plate 12 forms elongate flat surface portion 25 which opposes, is spaced away from, and is parallel to the arcuate semi-cylindrical portion 36 of base 10. Portions 35 and 36 circumscribe a portion of the inner space of the weir and are shaped and dimensioned to produce laminar flow in fluid flowing through the weir intermediate the flat surface portion 35 and the arcuate portion 36. The cross sectional area of the portion of the inner space of the weir circumscribed and bounded by portions 35 and 36 is less than the cross sectional area of the inner portion of the weir circumscribed by the inner wall surface 31 of end 30. The cross sectional areas referred to herein for the weir of the invention and for the conduit connected to the weir are each perpendicular to the direction of the flow of fluid, indicated by arrow F, through the weir and conduit. Consequently, the cross sectional area of the inner space of end 30 is circular. The cross-sectional area of the portion of the inner space of the weir which is bounded by surface portion 35 and arcuate portion 36 is semi-circular or in a "half-moon" shape.

Plate 12 also forms sloped elongate flat surface portions 37 and 38 which taper from ends 32 and 30, respectively, to flat portion 35. Surfaces 37 and 38 help to minimize any disruption in laminar flow which occurs while fluid moves from end 30, past flat portion 35, and out end 32. Plate 12 can also be removed from time to time to provide access to the weir for cleaning, repair or other maintenance.

Arcuate portion 36 lies in a semi-cylindrical plane which also passes through the lower portions of the ends 32 and 30. This structural feature of the invention is important because it simplifies construction of the weir of the invention and also facilitates the flow of fluid past flat portion 33 since fluid flowing along the bottom of the weir of FIG. 2 has a "straight shot" through the opening intermediate portions 35 and 36 and is not diverted from the normal direction of flow F of the fluid.

The distance, indicated by arrows B, between surfaces 35 and 36 is in the range of 0.25A to 0.75A and is preferably in the range of 0.375A to 0.625A, where A equals the inner diameter, indicated by arrows A, of the cylindrical ends 30 and 32 of the weir. The length, indicated by arrow C, of surface 35 is in the range of 0.5A to 4A and preferably is in the range of 1.5A to 3A, where A equals the inner diameter of ends 30 and 32.

Figure 3:
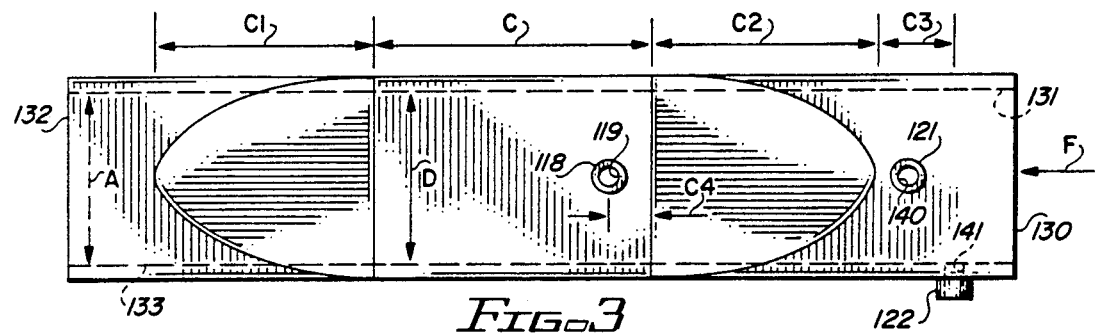
FIG. 3 is a top view of an alternate embodiment of a fluid diverting weir constructed in accordance with the principles of the invention; and, FIG. 4 is a side view of the weir of FIG. 3.
Figure 4:
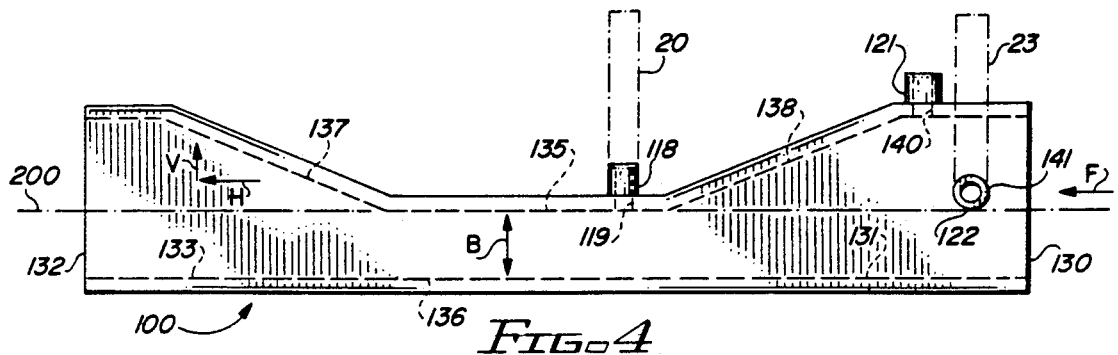

Another unitary embodiment of the weir of the invention is illustrated in FIGS. 3 and 4 and includes a first end 130 shaped and dimensioned to be connected to one end of a conduit. The conduit includes a central open space through which fluid normally moves by laminar flow along the conduit. The central space of the conduit has at each point along the length of the conduit a generally constant cross sectional area which is perpendicular to the direction of fluid flow through the elongate conduit. The conduit also has a wall, normally cylindrical, which circumscribes the central open space in the conduit. In the weir of FIGS. 3 and 4, the wall of the weir circumscribes and defines an open inner space in the weir through which fluid flows. The first end 130 of the weir typically has a cylindrical inner wall surface 131 having a diameter, indicated by arrows A, which corresponds to the diameter of the second inner cylindrical surface of the second end 132 of the weir and which also corresponds to the diameter of the inner surface of the wall of the conduit from which water or another fluid flows into the first end 130 of the weir. The equivalent inner diameters of the first end 130 and of the conduit help to maintain laminar fluid flow, indicated by arrow F, from the conduit into the weir.

Elongate flat surface portion 135 opposes, is spaced away from and is parallel to the arcuate semispaced cylindrical portion 136 of the weir. Portions 135 and 136 circumscribe a portion of the open inner space of the weir and are shaped and dimensioned to produce laminar flow in fluid flowing through the weir intermediate the flat surface portion 135 and the arcuate portion 136. The cross sectional area of the portion of the inner space of the weir circumscribed and bounded by portions 135 and 136 is less than the cross sectional area of the inner space of the weir circumscribed by the inner wall surface 131 and of end 130. The cross sectional areas referred to herein for the weir of FIGS. 3 and 4 and for the conduit connected to the weir are each perpendicular to the direction of the flow of fluid, indicated by arrow F, through the weir and conduit. Consequently, the cross sectional area of the inner space of end 130 is circular. The cross sectional area of the portion of the inner space of the weir which is bounded by surface portion 135 and arcuate portion 136 is semi-circular or in a "half-moon" or "half-pie" shape.

Sloped elongate flat surface portions 137 and 138 taper from ends 132 and 130, respectively, to flat surface portion 135. Surfaces 137 and 138 help to minimize any disruption in laminar flow which occurs while fluid moves from end 130, past flat surface portion 135, and out end 132.

Arcuate portion 136 lies in a semi-cylindrical plane which also passes through the lower portions of the ends 132 and 130. The distance, indicated by arrows B, between surfaces 135 and 136 is in the range of 0.25A to 0.75A and is preferably in the range of 0.375A to 0.625A, where A equals the inner diameter indicated by arrows A, of the cylindrical ends 130 and 132 of the weir. The length, indicated by arrows C, of surface 135 is in the range of 0.5A to 4A and preferably is in the range of 1.5A to 3.0A, where A equals the inner diameter of ends 130 and 132. The width of surface 135 is indicated by arrows D in FIG. 3, i.e., the width equals the diameter A.

An opening 119 extends through surface 135 and nipple 118. Similarly, an opening 140 extends through the wall of the weir and nipple 121; and, an opening 141 extends through the wall of the weir and nipple 122. Nipple 121 functions as a vent. Vent 121 can comprise a pressure release valve which is actuated when the pressure in the weir exceeds a selected value. Vent nipple 121 can also include a manually operated valve for bleeding air from within the weir or for reducing the pressure in the weir. A transparent standpipe 20 is normally sealingly attached to nipple 118. An L-shaped or "elbow" standpipe is normally attached to nipple 122. Standpipes 20 and 23 are transparent so that the fluid level in the standpipes 20 and 23 can be easily visually determined. Further, standpipes 20 and 23 can be provided with graduated markings to assist in determining the fluid levels in the standpipes.

In use, a section in an existing conduit or conduit network is removed. The removed section is replaced with the weir of FIGS. 1 and 2 or of FIGS. 3 and 4. For sake of this example, it is assumed that the weir of FIGS. 3 and 4 is utilized. When the weir is installed in the gap or space which remains in the conduit after a section of the conduit is removed, ends 130 and 132 are sealingly fitted to and integrated in the existing conduit so that the conduit network is rendered whole and operative. As earlier noted, ends 130 and 132 are shaped and dimensioned to facilitate the mating in and integration of the weir in an existing conduit line. Since the weir of FIG. 3 is unitary, properly sized (typically having a length equivalent to a conventional length of conduit), and is adapted to have ends 130 and 132 sealingly engage the exposed ends of conduit in the existing conduit line, installation of the weir is greatly facilitated. Tar, adhesive, concrete, or other materials can be utilized to seal ends 130 and 132 to the exposed ends of the existing conduit.

After the weir is installed "in line", water or another fluid is permitted to flow through the conduit line. The fluid flows from one end of the conduit line, through end 130, past surface 135 to produce kinetic energy, and through end 132 back into the conduit line. The laminar flow of the fluid continues when the fluid flows through ends 130 and 132 and flows intermediate portions 135 and 136. The hydraulic pressure in the weir can, as noted by Bernoulli's law and the principle of continuity in fluid flow, be determined by noting the levels in standpipes 20 and 23. Well known prior art means other than standpipes 20 and 23 can be utilized to determine the hydraulic pressure fluid flow rate, or the hydraulic grade differential in the weir. Since the diameter A of ends 130 and 132 is known and the dimensions of surfaces 137, 138, 135 are known, the circular cross sectional area of ends 130 and 132 is known along with the semi-circular cross sectional area intermediate surfaces 135 and 136.

The weir of the invention can be shaped and dimensioned to be utilized with a conduit which has an inner surface which has an elliptical shape, a rectangular shape, a semi-cylindrical shape, or has any other desired shape and dimension.

The weir of the invention provides a high degree of accuracy and readability in determining the flow of water diverted through the weir. The maintenance required is for the weir of the invention is, once the weir is installed, minimal or not required. The weir particularly useful when such a device needs to be integrated in an old, existing conduit network.

A particular advantage of the weir of the invention is the ability of the weir to pass debris. Rocks, gravel, sand, cans, bottles, citrus and tennis balls all pass through the weir with no problem. Further, regardless of the length of the approach conduit, of the absolute internal pressure in the weir, of entrained air, of debris at opening 130 which partially restricts the opening 130, the weir of the invention still, the large majority of the time, enables the accurate determination of the flow rate of fluid diverted through the weir. Air carried through the weir at normal atmospheric pressure also appears to have no noticeable affect in the ability of the weir accurately to monitor fluid flow rates.

The slope of surfaces 137 and 138 with respect to the horizontal axis 200 is in the range of 1:3; i.e., for each unit of measurement that surface 137 extends up or down in the plane of the paper of the drawings, the surface 137 also extends over a horizontal distance of three units of measurement. The slope of surface 137 and 138 can be in the range of 1:2 to 1:6. The slope of surface 137 can be different than the slope of surface 138 as long as the slope of each surface 137 and 138 is in the range of 1:2 to 1:6. In FIG. 4, arrow V indicates the distance that surface 137 moves vertically, while arrow H indicates the distance that surface 137 moves horizontally. The length of arrow H is three units of measurement for each unit of measurement included in the length of arrow V. As noted, the length of arrow V is presently one inch for each three inches of length of arrow H.

In FIG. 3, the lengths C, C1 and C2 are each presently 1.5A, where A is the inner diameter of ends 132 and 130 of the weir. Each length C, C1 and C2 is preferably in the range of 0.75D to 4.0D. The lengths C, C1 and C2 need not be equal to one another. Distances C3 and C4 are presently equal to 0.5A, where A is the inner diameter of end 132. Distances C3 and C4 need not be equal, and each can be in the range of 0.25A to 1.5A.

The inverted weir of the invention can be fabricated from concrete, plexiglass, or any other desired material and can be comprised of two or more parts which are assembled to form the weir. For example, the weir of FIG. 4 can be comprised of an upper and lower half which are connected or attached to one another to form the weir. The upper half would lie above a plane which passed through axis 200 and was perpendicular to the plane of the paper of the drawings. The lower half of the weir of FIG. 4 would lie below the plane.

Having described my invention in such terms as to enable those skilled in the art to understand and practise it, and having identified the presently preferred embodiments thereof, I claim:

1. In combination with an elongate conduit, the conduit including
    a central space through which fluid normally moves by laminar flow along the conduit, said central space having at each point along the length of the conduit a generally constant cross sectional area perpendicular to the direction of fluid flow through the conduit,
    a wall having an inner surface circumscribing the central space, and
    one end through which fluid flows out of said conduit,
    the improvement comprising an elongate weir, said weir including (a) an inner space through which fluid normally flows through the weir, said inner space having at each point along the length of said weir a cross sectional area perpendicular to the direction of fluid flow through said weir;
(b) a wall having an inner surface circumscribing said inner space of said weir;
(c) a first end shaped and dimensioned
   (i) to be connected to said one end of said conduit, and
   (ii) such that fluid moves by laminar flow from said one end of said conduit through said first end said weir,
said first end including a first section of said inner surface, said first section circumscribing a first portion of said inner space, said first portion having a cross sectional area generally equivalent to said cross sectional area of said conduit to facilitate the laminar flow of fluid from said one end of said conduit through said first end of said weir,
said inner surface of said wall of said weir including
(d) a flat elongate surface portion;
(e) an arcuate portion opposing and parallel to said flat elongate surface portion, said flat elongate portion and said arcuate portion circumscribing a second portion of said inner space and being shaped and dimensioned
   (i) such that the cross sectional area of said second portion of said central space is less than said cross sectional area of said first portion, and,
   (ii) to produce laminar flow in fluid flowing through said weir intermediate said flat elongate surface portion and said arcuate portion and deflect fluid downwardly from the highest of the conduit; and,
(f) means for measuring the pressure in said weir.

* * * * *